Jan. 27, 1959     H. V. SHAW     2,871,439
INDUCTION GENERATOR POWER SYSTEM
Filed Jan. 16, 1957
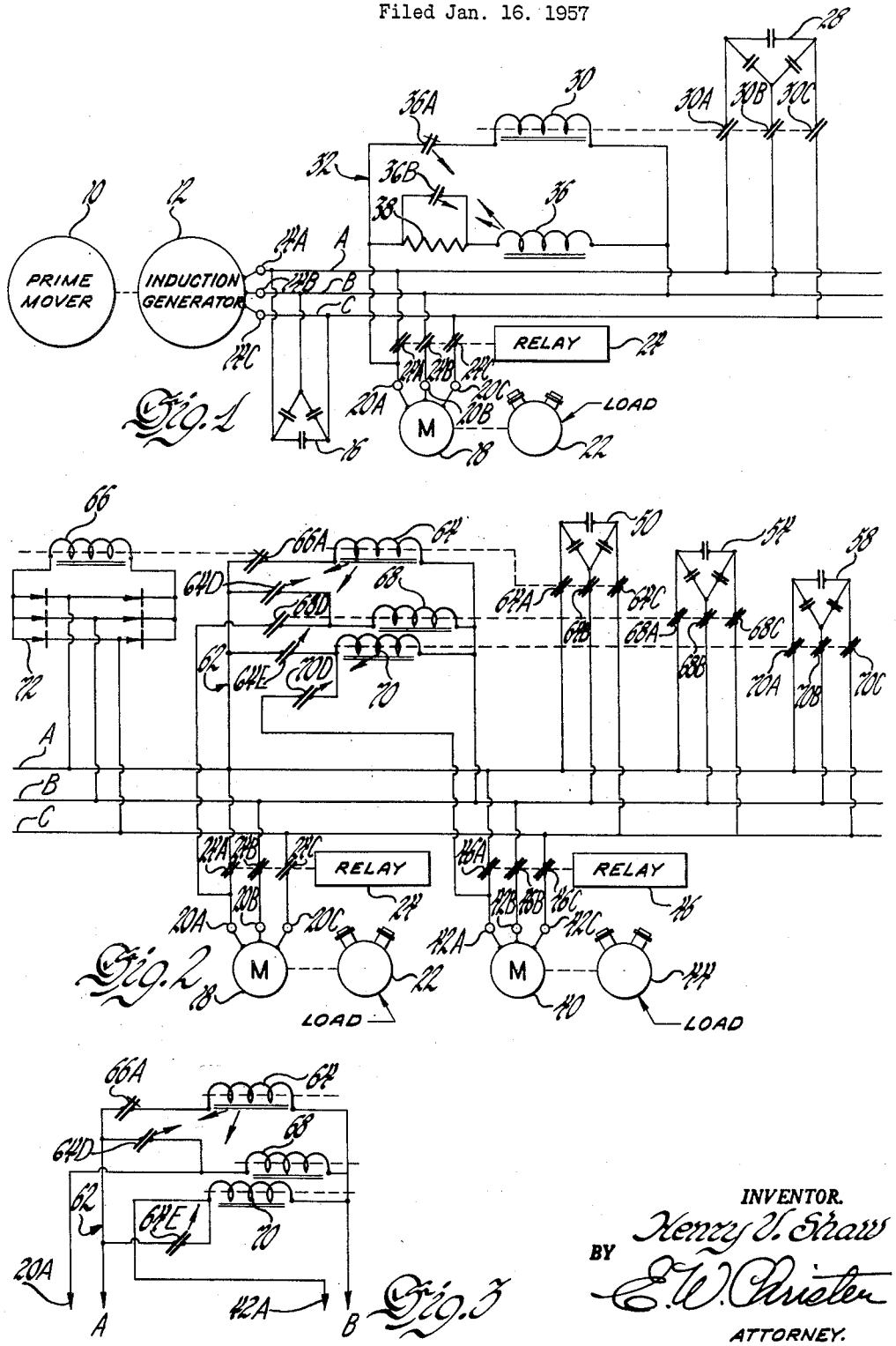
INVENTOR.
Henry V. Shaw
BY E. W. Christen
ATTORNEY.

United States Patent Office 2,871,439
Patented Jan. 27, 1959

2,871,439

INDUCTION GENERATOR POWER SYSTEM

Henry V. Shaw, Detroit, Mich., assignor to General Motors Corporation, Detroit, Mich., a corporation of Delaware Application January 16, 1957, Serial No. 634,552

4 Claims. (Cl. 322—47)

This invention relates to electrical power systems and more particularly to such systems employing a self-excited induction generator.

The induction generator offers many advantageous electrical and mechanical features including the squirrel cage rotor construction, and the absence of slip rings, commutators, and brushes. The induction generator, which requires little maintenance, is especially attractive for mobile power systems and may be operated as a self-excited machine by use of excitation capacitors.

The self-excited induction generator when driven by a prime mover will build up a terminal voltage, due to residual magnetic flux, which is determined by the speed of rotation, the no load characteristic of the machine, and the reactive volt amperes supplied by the excitation capacitors. The generator is capable of supplying any kind of load at a given voltage so long as the appropriate excitation is furnished. When a load is suddenly connected across the generator, the terminal voltage drops unless the excitation is adjusted accordingly. This effect is especially pronounced when the load is highly inductive, such as an induction motor, which draws a very high starting current at low lagging power factor. Such a load application is likely to cause the generator voltage to drop excessively and result in failure of motor starting unless special precautions are taken.

In accordance with this invention additional excitation is supplied the generator by connection of auxiliary excitation capacitors simultaneously with the load application. This is accomplished by interconnection of the load switching means with the auxiliary capacitor switching means. After the starting load has diminished, the generator voltage tends to rise to an excessive value, due to the additional excitation, unless additional control means are provided. Accordingly, voltage responsive relay means are provided to disconnect at least part of the auxiliary capacitors when a predetermined generator voltage is attained. To sustain the load, however, especially if successive loads are applied to the generator, it may be necessary to maintain the excitation of the generator at an increased value to maintain a desired line voltage. This is provided by automatic control circuits to retain connection, after the momentary starting load, of selected excitation capacitors corresponding to the increment of sustained load added to the generator.

A more complete understanding of this invention may be had from the detailed description which follows taken with the accompanying drawings in which:

Figure 1 is a schematic diagram of the inventive system;
Figure 2 is a schematic diagram of a modification of the inventive system; and
Figure 3 is a schematic diagram of a modification of the system illustrated in Figure 2.

Referring now to the drawings there is shown an illustrative embodiment of the invention in a three phase self-excited induction generator power system. The illustrative embodiment is especially adapted for mobile power systems such as those employed for supplying the electrical load of a railway refrigeration car, although it will be apparent that the invention is susceptible of numerous other applications and embodiments. In general, the system comprises a prime mover 10 mechanically coupled to the rotor of the induction generator 12 which has an excitation capacitor bank 16 connected across its terminals. An electrical load device, such as an induction motor 18 coupled to a mechanical load, for example, a refrigeration compressor 22, is adapted for connection to the induction generator. An auxiliary or starting capacitor bank 28 may be automatically connected and disconnected in accordance with load conditions by the control circuit 32.

The induction generator 12 has its stator or output terminals 14A, 14B, and 14C connected to the corresponding three phase transmission lines A, B, and C. A fixed value of self-excitation is provided the induction generator by the excitation capacitor bank 16 which comprises a delta connection of the capacitors across the transmission lines. The induction motor 18, having the input terminals 20A, 20B, and 20C and driving the compressor 22, is adapted for automatic connection to the transmission lines through the relay actuable contacts 24A, 24B, and 24C which are connected for actuation to a condition responsive relay 24. The relay 24 may, for example, take the form of a temperature sensing relay device of conventional design adapted to close the contacts when a controlled temperature reaches a predetermined value as in a refrigeration car.

In order to supplement the generator excitation during the starting interval of the motor 18 there is provided an auxiliary or starting capacitor bank 28. This capacitor bank comprises a delta connection of capacitors across the transmission lines through the line contacts 30A, 30B, and 30C. The auxiliary capacitor bank 28 is adapted to supply a value of capacitive volt amperes corresponding to the starting demand of the induction motor load 18. Automatic control of the starting capacitor bank 28 is effected by the associated control circuit 32. This control circuit is connected for energization between the generator output terminals 14A and 14B and suitably extends between the corresponding transmission lines A and B through the contacts 24A. The circuit includes, in series connection, the energizing coil of relay 30 and a pair of normally closed relay contacts 36A. The relay 30 is mechanically coupled to the contacts 30a, 30b, and 30c for actuation thereof to the closed position when the relay 30 is energized. In order to provide for automatic disconnection of the starting capacitor bank 28 when the generator voltage reaches a predetermined value, there is provided a voltage responsive control relay 36 in the control circuit 32. This relay 36 is serially connected with a voltage dropping resistor 38 and contacts 24A between the transmission lines A and B. Normally open contacts 36B are connected in parallel with resistor 38 and are closed by relay 36 upon energization thereof by a predetermined value of line to line voltage.

In operation, with the prime mover 10 driving the induction generator 12 at rated speed under no load conditions, the generator voltage is built up to a given value by virtue of the fixed excitation capacitor bank 16. When the condition responsive relay 24 is energized, signifying the need for compressor operation, the contacts 24A, 24B, and 24C are closed connecting the induction motor 18 across the transmission lines. This imposes a severe load, during the motor starting interval, upon the generator tending to cause the transmission line voltage to decrease. Simultaneously, however, the control circuit 32 is energized from the transmission lines A and B through the contacts 24A, the normally closed control relay contacts 36A and relay 30. Thus, the relay 30 is energized and the contacts 30A, 30B and 30C are closed connecting the starting capacitor bank 28 across the transmission lines. The additional excitation provided thereby is effective to maintain the generator voltage sufficiently high to ensure starting of the induction motor 18. As the motor comes up to speed, the load on the generator decreases and the generated voltage tends to increase to an excessive value. When the line to line voltage reaches a predetermined value the current through the series control relay 36 and resistor 38 is sufficient to actuate the control relay and thereby open the normally closed control relay contacts 36A. The opening of the control relay contacts 36A de-energizes the relay 30 causing the contacts 30A, 30B, and 30C to open and disconnect the starting capacitor bank 28. Accordingly, the generator voltage is prevented from reaching an excessive value and commences to decay toward the desired value. Simultaneous with the disconnection of the capacitor bank 28, the energization of the control relay 36 causes the corresponding control relay contacts 36B to close and the resistor 38 is effectively removed from the circuit. Thus the value of line to line voltage required to maintain actuating current in the control relay 36 is decreased and the voltage may drop to a predetermined low value without effecting any change in the control circuit. When the condition responsive relay 24 causes the contacts 24A, 24B, and 24C to open and disconnect the induction motor 18 from the transmission lines, the control circuit 32 is interrupted by the contacts 24A. The control relay 36 is de-energized and the control circuit is restored to its normal position by closure of the control relay contacts 36A and opening of the control relay contacts 36B.

The modification of the system, illustrated in Figure 2, provides for the automatic momentary connection of auxiliary capacitors during the starting interval of any load and additionally the sustained connection of auxiliary capacitors during the running period of any load in order to maintain the desired value of line voltage. In this system plural loads are illustrated including the induction motor 18 driving the compressor 22 and connectible to the transmission lines by the contacts 24A, 24B, and 24C actuated by the condition responsive relay 24. A similar load comprises the induction motor 40 driving the compressor 44 and connectible to the transmission lines by the contacts 46A, 46B, and 46C actuated by the condition responsive relay 46. Auxiliary capacitance during load starting is provided by a bank of starting capacitors 50 connected in delta fashion, the terminals of which may be connected through the contacts 64A, 64B, and 64C to the transmission lines. Additional auxiliary capacitance for load starting and running is provided by the bank of capacitors 54 which are connected in delta fashion. The capacitor bank 54 is connected through the contacts 68A, 68B, and 68C to the transmission lines. Similarly, auxiliary capacitance for starting and running is furnished by the bank 58 of capacitors which are connected in delta fashion through the contacts 70A, 70B, and 70C to the transmission lines. Automatic control for the auxiliary capacitor banks is provided by the control circuit designated generally at 62. This control circuit is connected for energization between the transmission lines A and B and includes, in series connection, the normally closed control relay contacts 66A and the energizing coil of relay 64. The control circuit also includes a portion corresponding to motor 18 which extends, in series connection between the transmission lines, through the normally open contacts 64D and the energizing coil of the relay 68. Associated with this branch of the control circuit is a holding circuit extending from one terminal 20A of the motor 18 through the normally open relay contacts 68D and the energizing coil of relay 68 thereof to the transmission line B. An additional branch of the control circuit corresponding to the motor 40 extends between the transmission lines and includes, in series connection, the normally open relay contacts 64E, actuated by relay 64, and the energizing coil of relay 70 which actuates the contacts 70A, 70B, and 70C. A holding circuit for the relay 70 is provided which extends from the terminal 42A of motor 40 through the normally open relay contacts 70D and the energizing coil of the corresponding relay 70 to the transmission line B.

The control circuit additionally includes a voltage responsive control relay 66 which has its energizing winding connected between the output terminals of the three phase full wave rectifier 72. The rectifier 72 has its input terminals connected to the transmission lines A, B, and C and thus the voltage applied to the relay 66 is proportional to the voltage output of the generator. The control relay 66 is operatively connected to the control relay contacts 66A for actuation thereof. The control relay 66 is adapted to operate at a predetermined pull-in voltage to open the contacts 66A and to operate at a predetermined drop-out voltage to close contacts 66A. The pull-in and drop-out voltages are suitably adjusted in accordance with the specific system of equipment employed.

In operation, it may be assumed for explanatory purposes that the system is started under no load conditions. As the prime mover and generator speed increases the line voltage will build up and the relay 64 will be energized through the normally closed control relay contacts 66A. Energization of the relay 64 causes the contacts 64A, 64B, and 64C to be closed connecting the auxiliary capacitor bank 50 across the generator terminals through the transmission lines. Simultaneously, the energization of the relay 64 causes relay contacts 64D and 64E to close resulting in energization of the relays 68 and 70, respectively, and actuation of the contacts 68A, 68B, and 68C and contacts 70A, 70B, and 70C, respectively, to connect the auxiliary capacitor banks 54 and 58 across the generator terminals. This auxiliary capacitance provided by the capacitor banks 50, 54 and 58 during generator starting interval causes the generator voltage to build up rapidly to a value corresponding to the pull-in voltage of control relay 66 to actuate the corresponding relay contacts 66A to the open position. This de-energizes the relay 64 which disconnects the capacitor bank 50. Simultaneously, the contacts 64D and 64E are opened, de-energizing the relays 68 and 70 to disconnect the capacitor banks 54 and 58, respectively. Thus a decrease in the excitation of the generator is effected and the generated voltage decreases to a value greater than that corresponding to the drop-out voltage of control relay 66 and the starting interval of the generator is completed.

When a load is applied to the generator, for example by operation of the condition responsive relay 24 to close the contacts 24A, 24B, and 24C, the starting current drawn by the motor 18 causes an initial decrease in generated voltage to a value less than the drop-out voltage of relay 66. Thus the control relay contacts 66A are re-closed and the relay 64 is energized. This causes the simultaneous connection of all of the capacitor banks 50, 54 and 58 across the generator terminals through the sequence of operation previously described in connection with generator starting. Accordingly, the increased excitation of the generator causes the voltage to be maintained sufficiently high to ensure starting of the induction motor 18. As the induction motor 18 comes up to speed and the electrical load on the generator decreases the line voltage begins to increase. When the value of line voltage reaches the predetermined pull-in voltage of control relay 66 the control relay contacts 66A are opened. Thus the relay 64 is de-energized and the capacitor bank 50 is disconnected. Simultaneously, relay contacts 64D and 64E are opened. The opening of contact 64D has no effect on the relay 68 and it remains energized through the holding circuit established from the transmission line A through the contacts 24A, holding contact 68D, and relay 68 to the transmission line B. The capacitor bank 54 corresponding to the induction motor load 18 therefore remains connected across the generator terminals and the additional excitation supplied thereby corresponds to that required to maintain the line voltage at the desired value. The opening of contacts 64E is effective to de-energize the relay 70 and, accordingly, the capacitor bank 58 is disconnected.

When the additional motor load 40 is connected across the generator the heavy starting current required by the motor causes the generated voltage to decrease to a value less than the drop-out voltage of the control relay 66. Accordingly, control relay contacts 66A are reclosed and the relay 64 is energized. Relay 64 connects the capacitor bank 50 and simultaneously closes the corresponding relay contacts 64E, energizing the relay 70 and closing the contacts 70A, 70B, and 70C to connect the capacitor bank 58 across the transmission lines. Thus additional excitation is provided to sustain the generated voltage during the starting interval of the motor 40 and as the motor comes up to speed and the load decreases the generated voltage increases. Upon reaching the predetermined pull-in voltage of control relay 66 the control relay contacts 66A are opened. Accordingly, the relay 64 is de-energized and the capacitor bank 50 is disconnected. The capacitor bank 54 corresponding to motor 18 remains connected, however, due to the closure of the holding circuit extending from the transmission line A through 24A, holding contacts 68D, and relay 68 to line B. Similarly, the capacitor bank 58 corresponding to the motor 40 remains connected due to the continued energization of the relay 70 through the holding circuit extending from the transmission line A through contacts 46A, holding contacts 70D, and relay 70 to transmission line B. The excitation supplied by the capacitor banks 54 and 58 is sufficient to maintain the generated voltage at a value greater than the predetermined drop-out voltage of the control relay 66.

When the induction motor 18, for example, is automatically disconnected by actuation of the relay 24, the opening of contacts 24A is effective to de-energize the relay 68. This causes the holding contacts 68D to open and simultaneously disconnects the capacitor bank 54 corresponding to the motor 18. Accordingly, the generator excitation is reduced in accordance with the load change and the generated voltage remains at its desired value. When the induction motor 40 is de-energized by operation of the relay 46 the opening of the contacts 46A, 46B, and 46C is effective to de-energize the relay 70. This causes the holding contacts 70D to open and simultaneously disconnects the capacitor bank 58. Thus, the excitation is further reduced in accordance with load and the generated voltage remains at its desired value. When the prime mover is shut down the generated voltage decreases to a value less than the drop-out voltage of the relay 66 and the control relay contacts 66A are closed. Accordingly, relay 64 is energized to connect the capacitor bank 50. Relays 68 and 70 may be energized by closure of relay contacts 64D and 64E. The additional excitation capacitance may cause the generated voltage to rise momentarily. However, the voltage falls rapidly due to the decreasing prime mover speed and simultaneously all relays will be de-energized and will assume the normal positions illustrated.

In Figure 3 there is illustrated a modification of the inventive system just described with respect to Figure 2. In this modification, the energizing coil of relay 68 is connected directly to the terminal 20A of the induction motor 18 and the holding contacts 68D are eliminated. Similarly, the energizing coil of relay 70 is connected directly to the terminal 42A of the induction motor 40 and the holding contacts 70D are eliminated. In operation of this embodiment the relay 68 is energized by closure of contacts 24A, 24B, and 24C by the condition responsive relay 24, and thus connection of the induction motor 18 is directly effective to cause connection of the capacitor bank 54 without regard to line voltage change. In the same manner the closure of the contacts 46A, 46B, and 46C, by relay 46 to connect the induction motor 40 across the lines, is effective to directly energize the relay 70 and thus connect the capacitor bank 58 without regard to line voltage change. Otherwise, the operation of this modification is the same as that described with respect to the embodiment of Figure 2.

Although the description of this invention has been given with respect to a particular embodiment it is not to be construed in a limiting sense. Many variations and modifications within the spirit and scope of the invention will now occur to those skilled in the art. For a definition of the invention reference is made to the appended claims.

I claim:

1. A power system comprising an induction generator having a pair of output terminals, a load device having a pair of input terminals, switching means interposed between the pairs of terminals for connecting the load device to the generator, a starting excitation circuit including a capacitor and relay actuable contacts and extending between the pair of output terminals, a control circuit connected across the pair of input terminals through said switching means and including a relay for closing said contacts when the load device is connected, said circuit also including control relay contacts in series with said relay, a control relay and a series resistor connected across said output terminals for opening said control relay contacts when the generator voltage reaches a predetermined value, and second control relay contacts connected in shunt with said resistor whereby the first control relay contacts are maintained open at a voltage less than said predetermined value.

2. A power system comprising an induction generator having a pair of output terminals, a load device having a pair of input terminals, switching means interposed between the pairs of terminals for connecting the load device to the generator, a generator excitation circuit extending between the pair of output terminals and including a capacitor and normally open relay contacts, a control circuit extending between the output terminals and including a relay operatively connected with said contacts and including series connected normally closed control relay contacts whereby the excitation circuit is closed when generator voltage is less than a first predetermined value, and a voltage responsive control relay having a pull-in voltage corresponding to a second predetermined value and a drop-out voltage corresponding to the first predetermined value, said control relay being operatively connected with said control relay contacts and connected for energization across the output terminals whereby said excitation circuit is opened when the generator voltage is greater than the second predetermined value and is closed when the generator voltage is less than said first predetermined value.

3. A power system comprising an induction generator having a pair of output terminals, a load device having a pair of input terminals, switching means interposed between the pairs of terminals for connecting the load device to the generator, a first generator excitation circuit extending between the pair of output terminals and including a capacitor and normally open, first relay contacts, a control circuit extending between the output terminals and including a first relay operatively connected with said contacts and including series connected normally closed control relay contacts whereby the excitation circuit is closed when the generator voltage is less than a predetermined value, a second excitation circuit extending between the pair of output terminals and including a capacitor and normally open second relay actuable contacts, said control circuit also including a second relay and a pair of normally open contacts operatively connected to the first relay and connected in series between the output terminals for energization, whereby both excitation circuits are closed when the generator voltage is less than a predetermined value, a holding circuit extending between said output terminals and including normally open holding contacts operatively connected with said second relay, said switching means, and said second relay in series connection, whereby connection of said load device is effective to maintain the second excitation circuit closed, and a voltage responsive control relay operatively connected with said control relay contacts and connected for energization across the output terminals whereby said first excitation circuit is opened when the generator voltage is greater than said predetermined value.

4. A power system comprising an induction generator having a pair of output terminals, a load device having a pair of input terminals, switching means interposed between the pairs of terminals for connecting the load device to the generator, a first generator excitation circuit extending between the pair of output terminals and including a capacitor and normally open, first relay contacts, a control circuit extending between the output terminals and including a first relay operatively connected with said contacts and including series connected normally closed control relay contacts whereby the first excitation circuit is closed when the generator voltage is less than a predetermined value, a second excitation circuit extending between the pair of output terminals and including a capacitor and normally open second relay actuable contacts, said control circuit also including a second relay and a pair of normally open contacts operatively connected to the first relay and connected in series between the output terminals for energization, whereby the second excitation circuit is closed when the generator voltage is less than a predetermined value, a holding circuit extending between said output terminals, and including said switching means and said second relay in series connection, whereby connection of said load device is effective to cause the second excitation circuit to be closed, and a voltage responsive control relay operatively connected with said control relay contacts and connected for energization across the output terminals whereby said first excitation circuit is opened when the generator voltage is greater than said predetermined value.

References Cited in the file of this patent

UNITED STATES PATENTS

| | | |
|---|---|---|
| 1,676,312 | Alexanderson | July 10, 1928 |
| 1,991,063 | Rudenberg | Feb. 12, 1935 |
| 2,298,026 | Bany | Oct. 6, 1942 |
| 2,436,302 | Hyde et al. | Feb. 17, 1948 |
| 2,573,071 | Storsand | Oct. 30, 1951 |

FOREIGN PATENTS

| | | |
|---|---|---|
| 651,029 | Great Britain | Mar. 7, 1951 |